United States Patent
Hall et al.

(10) Patent No.: US 10,314,435 B2
(45) Date of Patent: Jun. 11, 2019

(54) STEAM DRIVEN DISH WARMER

(71) Applicant: Geoff Hall, Solihull (GB)

(72) Inventors: Geoff Hall, Solihull (GB); Steven Murphy, Penllyn, PA (US)

(73) Assignee: Geoff Hall, Solihull (GB)

( * ) Notice: Subject to any disclaimer, the term of this patent is extended or adjusted under 35 U.S.C. 154(b) by 195 days.

(21) Appl. No.: 15/201,463

(22) Filed: Jul. 3, 2016

(65) Prior Publication Data
US 2018/0000288 A1    Jan. 4, 2018

(51) Int. Cl.
| F26B 3/04 | (2006.01) |
| F26B 9/00 | (2006.01) |
| F26B 9/06 | (2006.01) |
| A47J 39/02 | (2006.01) |
| F26B 21/00 | (2006.01) |

(52) U.S. Cl.
CPC ............. *A47J 39/025* (2013.01); *F26B 3/04* (2013.01); *F26B 9/003* (2013.01); *F26B 9/06* (2013.01); *F26B 21/001* (2013.01); *F26B 21/005* (2013.01)

(58) Field of Classification Search
CPC .. F26B 3/04; F26B 9/06; F26B 21/001; F26B 21/005; A47J 39/025
USPC .......................................................... 34/517
See application file for complete search history.

(56) References Cited

U.S. PATENT DOCUMENTS

| 2,688,911 A | * | 9/1954 | Hochmayr | ............... A47J 31/30 219/214 |
| 4,095,086 A | * | 6/1978 | Ohnmacht | ............ A47J 31/542 392/467 |
| 4,287,817 A |   | 9/1981 | Moskowitz | |
| 4,346,057 A | * | 8/1982 | Bowser | ..................... B01L 9/06 159/22 |
| 4,516,484 A |   | 4/1985 | De Ponti | |
| 4,565,121 A | * | 1/1986 | Ohya | ...................... A47J 31/56 392/445 |
| 5,010,660 A | * | 4/1991 | Hambleton | ............... B08B 9/28 34/104 |

(Continued)

FOREIGN PATENT DOCUMENTS

| CA | 2411809 A1 | * | 5/2004 | ............. A47J 31/401 |
| GB | 1357265 A | * | 6/1974 | ............... B01D 1/20 |

(Continued)

OTHER PUBLICATIONS

International Search Report in PCT/US2017/040560, dated Nov. 16, 2017.

(Continued)

*Primary Examiner* — Stephen M Gravini
(74) *Attorney, Agent, or Firm* — Muskin and Farmer LLC

(57) ABSTRACT

A dish dryer/warmer which is powered by steam that is exhausted from a steam kettle. A hollow inserts fits into a spout on the kettle and a hose connects the spout to the dish dryer. The steam is then funneled into the dish dryer. A set of holders inside the dish dryer are mechanically activated based on what, so that if a dish is placed into a holder then steam will be discharged directly into that holder, thereby warming the respective dish. A plurality of such holders can be present inside the dish dryer and each one is selectively activated to discharge steam when an object is placed inside a respective holder. All of the holders in the dish dryer share the same steam source (the kettle or other source).

20 Claims, 8 Drawing Sheets

(56) References Cited

U.S. PATENT DOCUMENTS

| | | | | |
|---|---|---|---|---|
| 5,267,506 A * | 12/1993 | Cai | ................ | A47J 31/30 99/280 |
| 5,367,607 A * | 11/1994 | Hufnagl | ................ | A47J 31/36 392/397 |
| 5,373,836 A * | 12/1994 | Mifune | ................ | A47J 27/21041 126/1 F |
| 5,469,635 A * | 11/1995 | Lamontagne | ........ | F26B 21/006 34/104 |
| 5,509,348 A | 4/1996 | Klawuhn | | |
| 5,778,765 A * | 7/1998 | Klawuhn | ................ | A47J 31/46 99/290 |
| 6,170,166 B1 * | 1/2001 | Johansen | ................ | A47L 15/48 34/595 |
| 6,279,458 B1 * | 8/2001 | Sham | ................ | A47J 31/0573 99/281 |
| 6,330,849 B1 | 12/2001 | Chao | | |
| 6,626,086 B2 * | 9/2003 | Eugster | ................ | A47J 31/4485 261/DIG. 76 |
| 6,779,434 B2 | 8/2004 | Hsu | | |
| 7,441,495 B2 * | 10/2008 | Halle | ................ | A47J 31/401 141/351 |
| 8,534,276 B2 * | 9/2013 | Palumbo | ............ | A47J 27/21166 126/344 |
| 8,595,951 B2 * | 12/2013 | Peet | ................ | F26B 9/003 211/12 |
| 8,820,218 B2 * | 9/2014 | Fischer | ................ | A47J 43/12 99/323.1 |
| 9,113,748 B2 * | 8/2015 | Van De Leijgraaf | ................ | A47J 31/002 |
| 9,113,751 B2 * | 8/2015 | Cocco | ................ | A47J 31/3671 |
| 2008/0011740 A1 | 1/2008 | Goltenboth | | |
| 2008/0257970 A1 | 10/2008 | Erdmann | | |
| 2012/0111203 A1 | 5/2012 | Noordhuis | | |
| 2017/0325625 A1 * | 11/2017 | Menashes | ............ | A47J 31/4489 |
| 2018/0000288 A1 * | 1/2018 | Hall | ................ | A47J 39/025 |

FOREIGN PATENT DOCUMENTS

| | | | | | |
|---|---|---|---|---|---|
| JP | WO 0043585 A1 * | 7/2000 | | ............ | A45D 20/10 |
| WO | WO 2004041043 A2 * | 5/2004 | | ............ | A47J 31/401 |

OTHER PUBLICATIONS

Written Opinion of the International Search Authority in PCT/US2017/040560, dated Nov. 1, 2017.

* cited by examiner

STEAM DRIVEN DISH WARMER

BACKGROUND OF THE INVENTION

Field of the Invention

The present general inventive concept is directed to a method and apparatus for a dish dryer.

Description of the Related Art

Dish dryers exist which can be powered by electricity. This can be disadvantageous in that they use extra power as well as require an additional electrical outlet (or a battery).

SUMMARY OF THE INVENTION

It is an aspect of the present invention to provide a dish dryer/warmer.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 4D is an exploded view of the actuating mechanism, according to an

DESCRIPTION OF THE PREFERRED EMBODIMENTS

Figure 1:
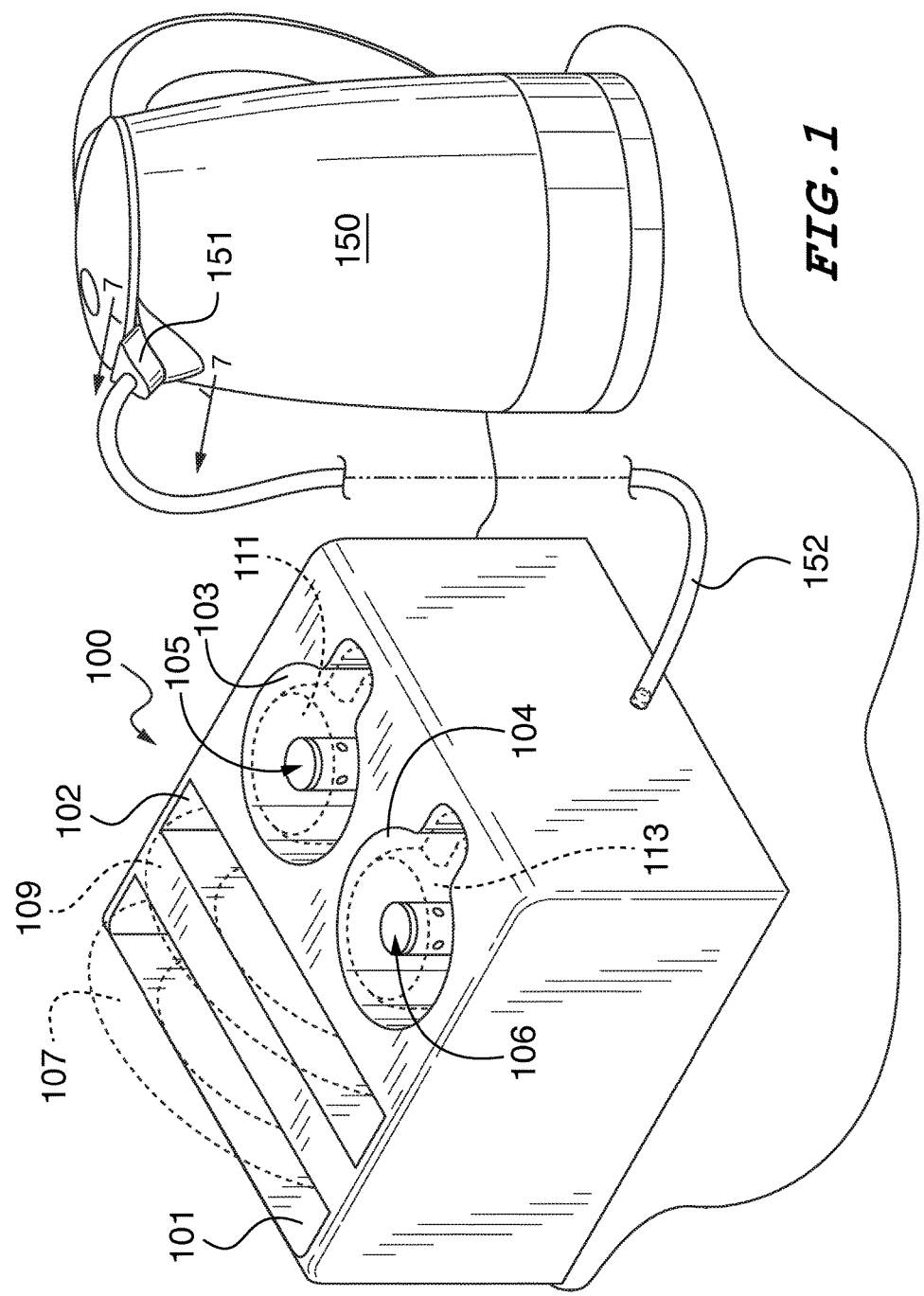
FIG. 1 is drawing of a kettle and a dish dryer, according to an embodiment.

Reference will now be made in detail to the presently preferred embodiments of the invention, examples of which are illustrated in the accompanying drawings, wherein like reference numerals refer to like elements throughout.

The present inventive concept relates to a dish dryer (also referred to as dish warmer) which is powered from steam which exits from a kettle (or other steam source, such as a teapot, grill, etc.) The kettle is a standard kettle and a hose comes with attachments to attach the hose to a spout on the kettle so that the discharging steam is funneled into the dish dryer. The dish dryer has different areas for different types of dishes, such as plates, cups, etc., and they are all selectively activated such that when the dish or plate is inserted, then automatically steam would be channeled thereto to dry that particular dish. "Dish" as used herein can refer to any type of cookware used to eat on, such as plates, cups, etc.

The steam from the kettle serves to dry the plates and cups inside the dish dryer without the need for electricity and manual drying. When the dish dryer is operated, the cups and plates inside should eventually (by virtue of being steamed) result in being dry and warm. Warm cups and plates are generally desirable by people who are about to use them.

FIG. 1 is drawing of a kettle and a dish dryer, according to an embodiment.

A kettle 150 has a spout with an insert 151 inserted into the spout. The insert 151 is attached to a hose 152 which then connects to a dish dryer 100 so the steam traveling through the hose 152 discharges inside the dish dryer 100. Both attachments (to the kettle and to the dish dryer) should be hermetic so that no steam escapes except through the hose 152.

A first cup 113 and a second cup 111 are inserted into a first cup holder 104 and a second cup holder 103, respectively. A first cup platform 106 is inside the first cup holder 104 and a second cup platform 105 is inside the second cup holder 103. A first plate 109 is inserted into a first plate holder 102 and a second plate 107 is inserted into a second plate holder 101.

Figure 2:
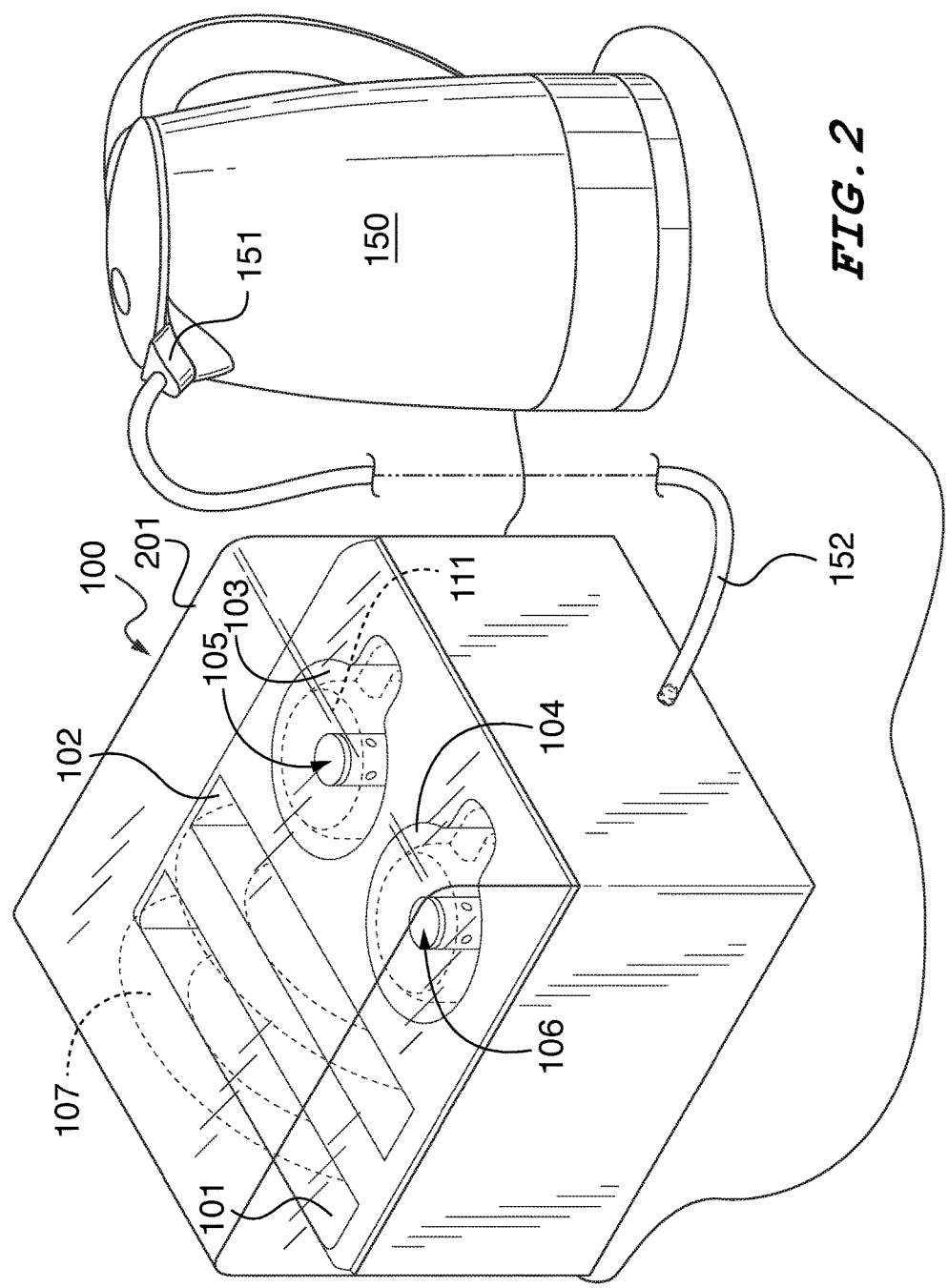
FIG. 2 is a drawing of a kettle and a dish dryer with a lid, according to an embodiment.

FIG. 2 is a drawing of a kettle and a dish dryer with a lid, according to an embodiment.

An optional lid 201 is transparent and can be used to house the dishes (and the steam) which collects inside the dish dryer 100. Optional air holes (not pictured) can be located anywhere on the lid 201 to let the air circulate between inside and outside of the dish dryer 100. Otherwise, the dish dryer 100 with the lid 201 operates in the same manner as without the lid 201. The lid can open and close would forms a hermetic seal around the entire dish dryer (but for any optional vent holes in the dish dryer).

Figure 3:
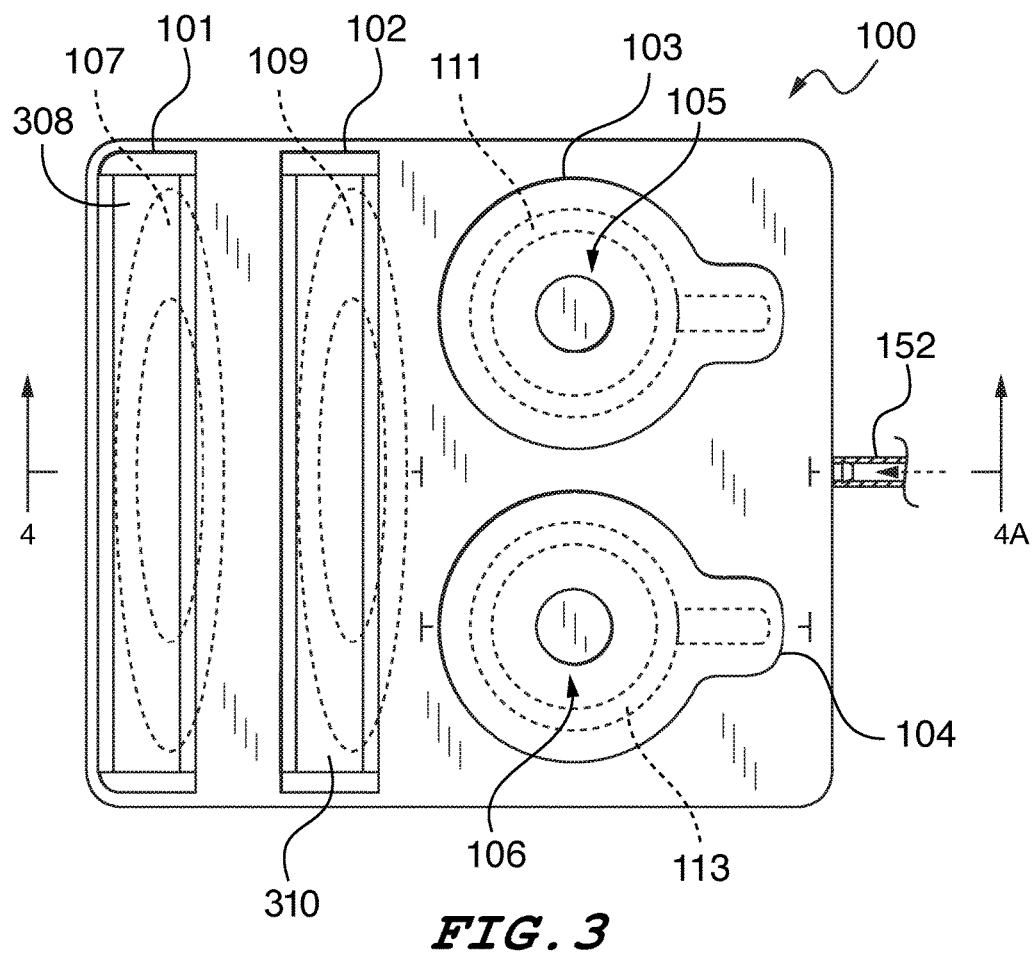
FIG. 3 is a top down drawing of a dish dryer, according to an embodiment.

FIG. 3 is a top down drawing of a dish dryer, according to an embodiment.

Note the inflow of steam from the hose 152 into the inside of the dish dryer 100. A second plate platform 308 is under the second plate holder 101 and a first plate platform 310 is under the first plate holder 102. The flow of steam from the kettle to inside the dryer should be airtight so no steam is lost therebetween.

Figure 4A:
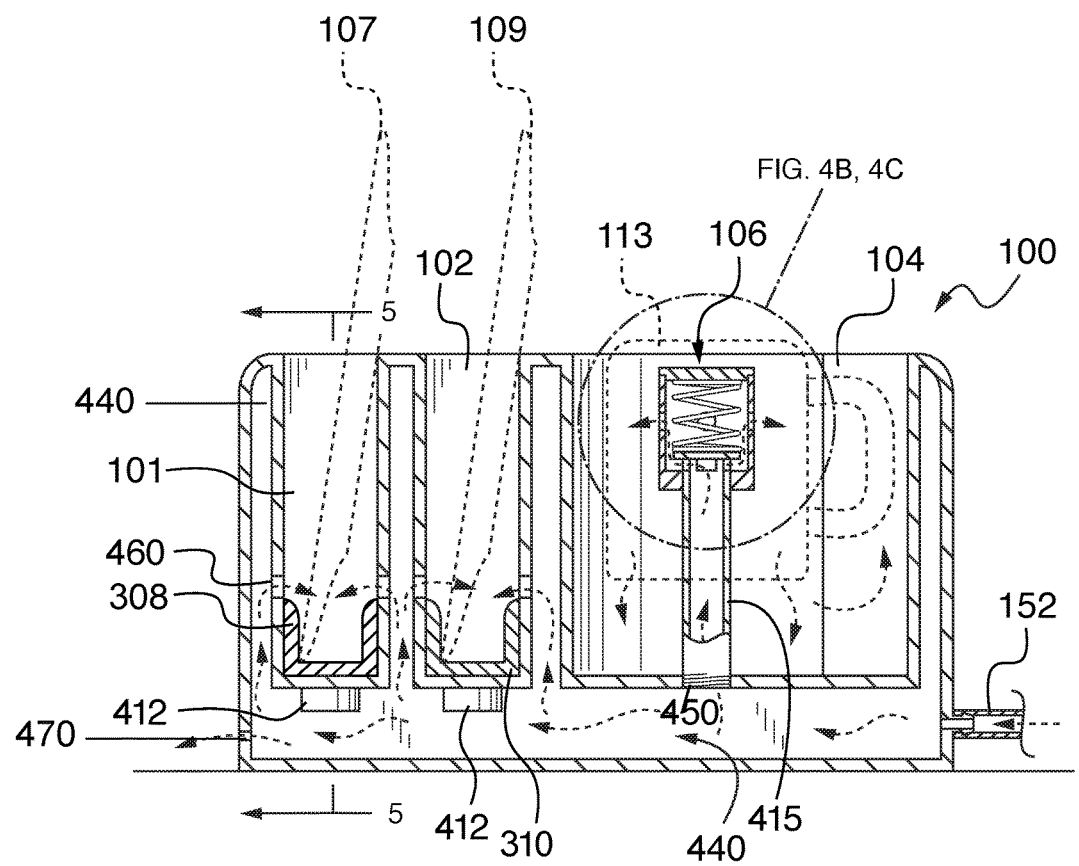
FIG. 4A is a drawing of a front of a dish dryer showing the internal mechanism, according to an embodiment.

FIG. 4A is a drawing of a front of a dish dryer showing the internal mechanism, according to an embodiment.

Note the flow of steam out of the hose 152. The steam passes under the cup holders 103, 104, and under the plate holders 101, 102 and out an air vent. The first cup 113 in the first cup holder 104 is placed on the first cup platform 106. The weight of the first cup 113 pushes the first cup platform 106 downward thereby enabling the steam to flow into the first cup 113 thereby warming the first cup 113. Both cup holders operate in the same manner. The steam will flow through a steam channel 440 and into a hollow post 415 (the steam will always flow into the hollow post 415 whether or not a cup is placed inside the cup holder or not).

The steam also flows through plate holes 460 and into the plate holders 101, 102 thereby warming the plates. Spring holes 412 are under the second plate platform 308 and the first plate platform 310.

Figure 4B:
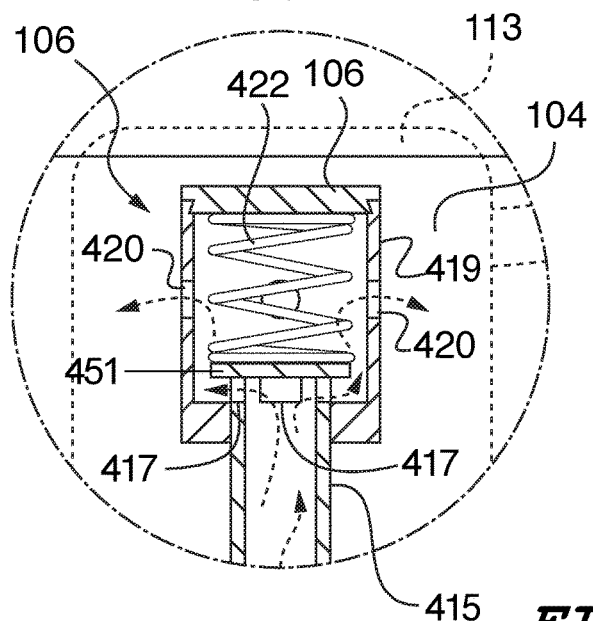
FIG. 4B is an enlarged view of the actuating mechanism in the open position, according to an embodiment.

FIG. 4B is an enlarged view of the actuating mechanism in the open position, according to an embodiment. The open position means that a cup is placed on top of the actuating mechanism thereby enabling steam to flow into the cup.

Steam flows through the first hollow post 415. Note that the weight of the first cup 113 presses down onto the first cup platform 106. This presses down on a spring 422 which contracts and exposes an area under a spring floor 451 which allows the steam to pass through post holes 417 under the spring floor 451 and into a cylinder 419 and out cylinder holes 420 in first cup holder 104. The first cup platform 106 is attached to the top of the cylinder 419. The force of the first cup 113 pressing down onto the first cup platform 106 also takes the cylinder 419 down along with it as shown in FIG. 4B (contrasted with FIG. 4C).

Figure 4C:
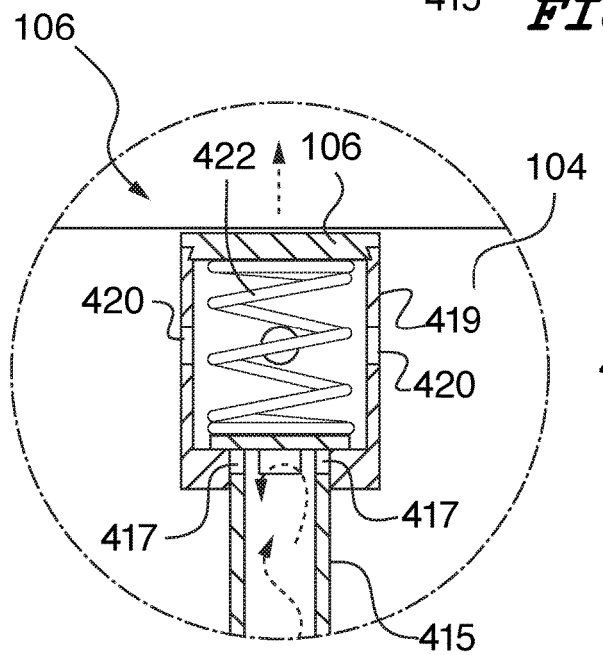
FIG. 4C is an enlarged view of the actuating mechanism in the closed position, according to an embodiment.

FIG. 4C is an enlarged view of the actuating mechanism in the closed position, according to an embodiment. Contrast FIG. 4C (which has no cup and hence no steam existing this actuating mechanism) with FIG. 4B (which as a cup actuating the actuating mechanism and hence enable steam to flow therethrough).

The spring 422 naturally presses the first cup platform 106 up, which pushes up the cylinder 419 which has a bottom portion (which can also be considered a hole sealer) which completely covers the post holes 417 which means that the steam is "stuck" in the first hollow post 415 and cannot enter the cylinder (and hence is channeled to exit where it may be needed in other cup holder(s) or plate holder(s).

Figure 4D:
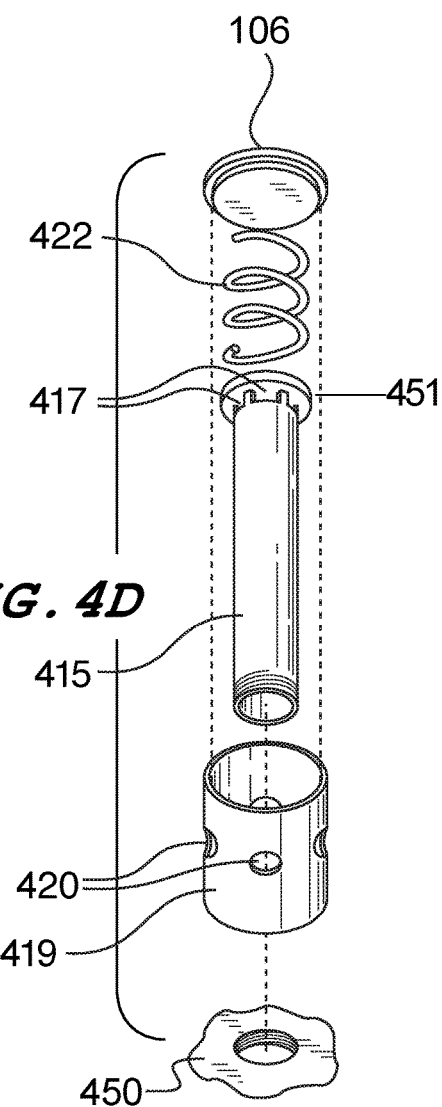

FIG. 4D is an exploded view of the actuating mechanism, according to an embodiment.

The hollow post 415 has post holes 417 on its upper end and a spring floor 451 just above the post holes 417. A spring is between the spring floor 451 and a cup platform 106. The cylinder 419 has cylinder holes 420. The top of the cylinder 419 can screw into the bottom of the cup platform. The bottom of the hollow post 415 can screw into a post base 450 which is right above the steam channel 440 (see FIG. 4A).

Figure 5A:
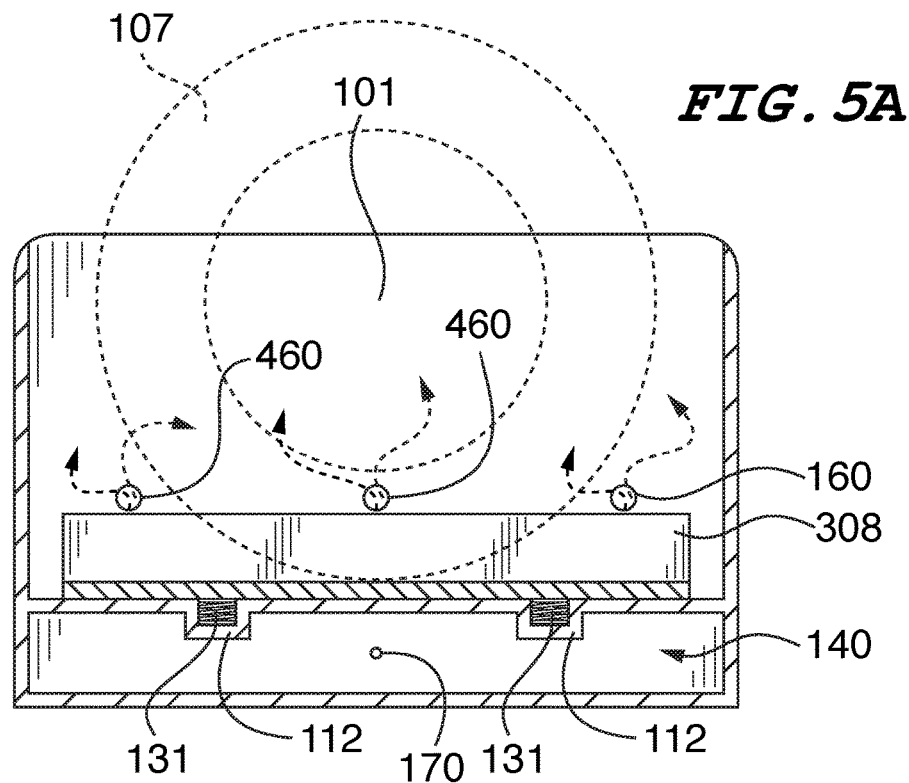
FIG. 5A is a side drawing of a dish dryer with the plate warmer in the open position, according to an embodiment.

FIG. 5A is a side drawing of a dish dryer with the plate warmer in the open position, according to an embodiment.

Plate springs 131 inside spring holes 112 are used to press a second plate platform 308 upward. When a plate (or cup) is put in the second plate holder 101, the second plate platform 308 is pressed downward (overcoming the resistance of a first plate spring 131). This exposes plate holes 460 which enables the steam to flow into the first plate holder 101. See FIG. 4A for another view of the plate holes 460 and how they are exposed by the second plate platform 308 when the second plate is inserted into the second plate holder 101.

Note a vent hole 470 enables the steam to exit the dish dryer. This vent hole 470 can be optional (although is recommended when implementing the embodiment utilizing the lid 201). Note that the vent hole 470 is typically relatively small, in this way of none of the holders in the dish dryer are being utilized (no dishes and no plates are inserted), then the steam will need a place to exit and can exit out the vent hole 470. But when at least one cup or plate (or any other type of dish) is inserted into a respective holder, then the steam by virtue of the vent hole 470 being small, would be encouraged to exit through the respective holder that is being activated (has a cup or plate inserted in it).

Figure 5B:
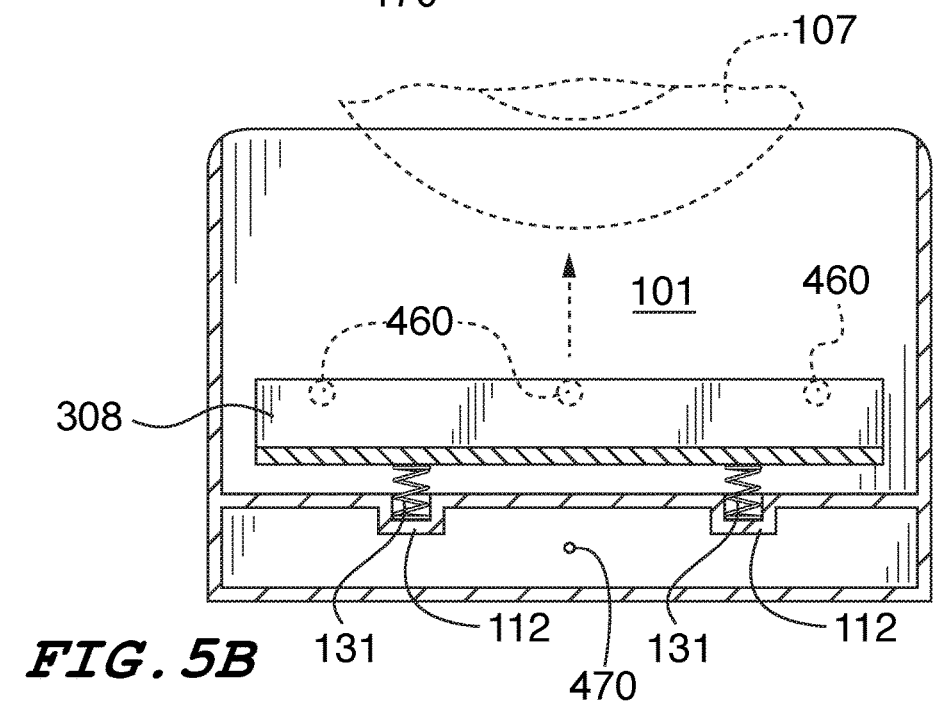
FIG. 5B is a side drawing of a dish dryer with the plate warmer in the closed position.

FIG. 5B is a side drawing of a dish dryer with the plate warmer in the closed position.

When there is no plate (or other object) inside the second plate holder, the spring 131 inside the spring hole 112 pushes upward on the plate platform 308 thereby covering the plate holes 460 by the second plate platform 408. The second plate platform 408 is actually 'U' shaped as illustrated in FIG. 4A, although it can also be considered that the sides of the platform 408 are hole sealers (which cover plate holes 460) and the bottom is the plate platform 408. In the upward (or closed position), steam will not enter the second plate holder and will continue to flow through the steam channel 440.

Note that all plate holders work in the same manner, and all cup holders work in the same manner. A dish dryer can be configured to have any number of plate holders combined with any number of cup holders. For example, a dish dryer can come with only 1 plate holder, only 1 cup holder, 1 plate holder and 1 cup holder, 2 plate holders and 1 cup holder, 1 plate holder and 2 cup holders, 2 plate holders and 2 cup holders, 3 plate holders and 3 cup holders, or any such combination (can even be any combination of up to 10 each or more). Other objects besides cups and plates can be used in the plate holders and cup holders as well and the inventive concept is not limited to accommodating only plates and/or cups. If no objects are placed into the dish dryer then the steam would fill the steam channel 440 and exit out of the vent hole 750 (or a plurality of such vent holes). If one object is placed into the dish dryer then the steam would mostly be channeled to that particular holder (and some would also exit out of the vent hole 750). If two objects are placed into the dish dryer, then the steam would be shared between the holders in the two objects (with a small amount also exiting the vent hole). Thus, the fewer number of objects placed into the dish dryer, the stronger the steam discharge into the respective holder for those objects would be.

Figure 6:
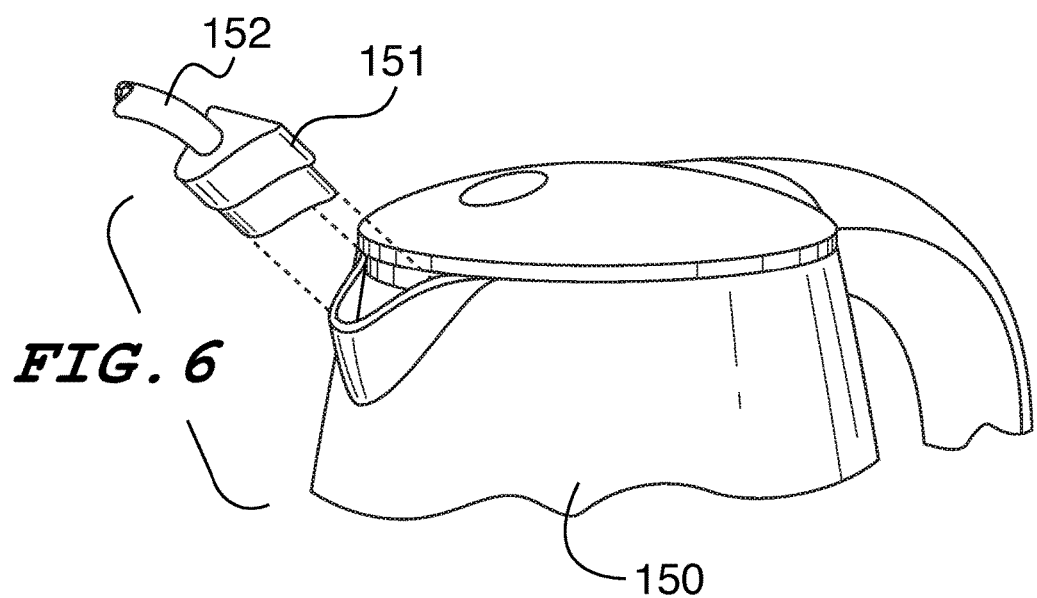
FIG. 6 is a drawing of a kettle with an insert, according to an embodiment.

FIG. 6 is a drawing of a kettle with an insert, according to an embodiment.

The hose 152 is connected inside an insert 151 which fits tightly inside the spout of the kettle 150, thereby not enabling any steam to exit the kettle but for entering the holes 152. Note that there are many different makes of kettles and each may have a differently shaped spout. Therefore, numerous shaped inserts can be provided which are shaped to fit common types of kettle spouts. The invention can come in a kit form which includes a variety of such inserts having different shapes so most kettle types can be accommodated.

Figure 7:
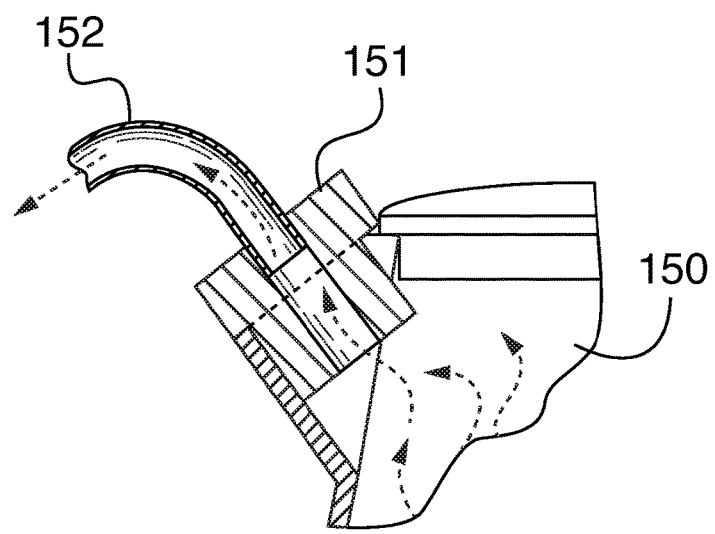
FIG. 7 is an internal drawing of a kettle with insert, according to an embodiment.

FIG. 7 is an internal drawing of a kettle with insert, according to an embodiment.

The steam flows from the kettle 150 through the insert 151 (which is hollow) and into the hose 152. The insert can be made of a malleable material, such as Styrofoam, rubber, plastic, etc., so that it can deform a little (if necessary) so it fits snugly into the kettle spout.

As stated above, numerous shaped inserts can be provided so that the user can fit the hose on a variety of different types/makes of kettles.

Figure 8:
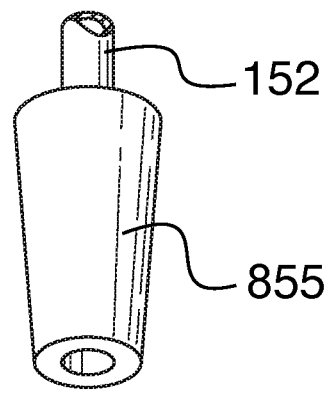
FIG. 8 is a drawing of a circular kettle insert, according to an embodiment.

FIG. 8 is a drawing of a circular kettle insert, according to an embodiment.

A circular insert 855 would fit inside a spout which matches the circular profile of the circular insert 855. The insert should be made of a malleable material so that even if it doesn't match the profile of the spout exactly, it can be forced into the spout.

Figure 9:
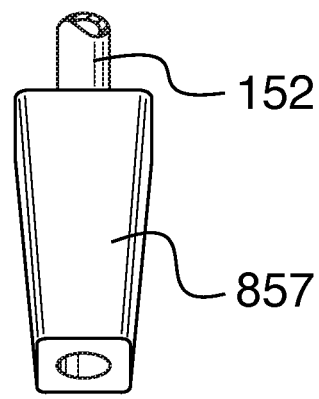
FIG. 9 is a drawing of a square kettle insert, according to an embodiment.

FIG. 9 is a drawing of a square kettle insert, according to an embodiment.

A square shaped insert 857 would fit a square shaped spout on a kettle.

Note that when something is stated as being "connected to" or "attached to" (or similar language), it does not necessarily mean that the two parts are directly connected to each other as they can be indirectly connected via intermediate parts which may or may not be mentioned.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus, comprising:
   a holder;
   a steam channel comprising a path leading to a hole which leads to an inside of the holder;
   a platform connected to a hole sealer; and
   a spring connected to the platform, the spring configured to naturally press the hole sealer upward into an up position which covers the hole, and downward weight on the platform presses the hole sealer down into a down position which exposes the hole.

2. The apparatus as recited in claim 1, further comprising a hose connected to the steam channel.

3. The apparatus as recited in claim 2, further comprising a hollow insert connected to the hose.

4. The apparatus as recited in claim 3, wherein the hollow insert adapted to fit into a kettle spout.

5. The apparatus as recited in claim 1, further comprising a plurality of hollow inserts adapted to fit a respective kettle spout, each of the plurality of hollow inserts having different shapes.

6. The apparatus as recited in claim 1, further comprising a vent hole contacting the steam channel.

7. The apparatus as recited in claim 1, further comprising a lid configured to open and close.

8. The apparatus as recited in claim 1, wherein the holder is shaped in a cup shape.

9. The apparatus as recited in claim 1, wherein the holder is shaped in a plate shape.

10. The apparatus as recited in claim 1, further comprising:
    a second holder shaped in a plate shape;
    the steam channel comprising a path leading to a second hole which leads to an inside of the second holder;
    a second platform connected to a second hole sealer;
    and a second spring connected to the platform, the second spring configured to naturally press the second hole sealer upward into a second up position which covers the second hole, and downward weight on the second platform presses the second hole sealer down into a second down position which exposes the second hole.

11. The apparatus as recited in claim 1, wherein the path is a hollow post connecting to the platform.

12. An apparatus, comprising:
    a holding means for holding a cup or plate;
    a platform means inside the holding means;
    a steam receiving means for receiving steam from a steam source; and
    a spring means for raising the platform means into an up position which covers a hole and downward weight on the platform means presses the platform means into a down position which exposes the hole which directs the steam into the holding means.

13. The apparatus as recited in claim 12, wherein the holding means is structured to hold a cup.

14. The apparatus as recited in claim 12, wherein the holding means is structured to hold a plate.

15. The apparatus as recited in claim 12, further comprising: a second holding means for holding a cup; a second platform means inside the second holding means; and a second spring means for raising the second platform means into an up position which covers a second hole and downward weight on the second platform means presses the second platform means into a down position which exposes the second hole which directs the steam into the second holding means.

16. The apparatus as recited in claim 12, further comprising insert means for connecting a hose to the steam source.

17. The apparatus as recited in claim 12, wherein the steam source is a kettle.

18. A method, comprising:
    providing a dish dryer connected to a hose;
    connecting the hose to a kettle;
    placing a plate or cup inside a holder in dish dryer, thereby causing:
        steam entering the dish dryer from the kettle through the hose;
        exposing a hole in the holder;
        steam entering the holder through the hole; and
        the steam warming the plate or cup.

19. The method as recited in claim 18, wherein the plate or cup is a plate.

20. The method as recited in claim 18, wherein the plate or cup is a cup.

* * * * *